(12) United States Patent
Callard et al.

(10) Patent No.: US 10,230,650 B2
(45) Date of Patent: Mar. 12, 2019

(54) JOINT RADIO LINK CONTROL (RLC) SIGNALING WITH NETWORK CODING

(71) Applicant: Huawei Technologies Co., Ltd., Shenzhen (CN)

(72) Inventors: Aaron Callard, Ottawa (CA); Philippe Leroux, Ottawa (CA); Alex Stephenne, Stittsville (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 12 days.

(21) Appl. No.: 14/751,256

(22) Filed: Jun. 26, 2015

(65) Prior Publication Data

US 2016/0381665 A1 Dec. 29, 2016

(51) Int. Cl.
*H04W 72/04* (2009.01)
*H04W 28/02* (2009.01)
*H04W 72/10* (2009.01)
*H04L 12/823* (2013.01)
*H04B 7/022* (2017.01)
(Continued)

(52) U.S. Cl.
CPC .......... *H04L 47/32* (2013.01); *H04B 7/022* (2013.01); *H04L 1/12* (2013.01); *H04W 28/0205* (2013.01); *H04W 72/1242* (2013.01)

(58) Field of Classification Search
CPC .......... H04W 72/042; H04W 28/0205; H04W 72/10
USPC .................................................. 370/328, 329
See application file for complete search history.

(56) References Cited

U.S. PATENT DOCUMENTS 7,769,495 B1 * 8/2010 Rodkey ................. G05B 15/02
 700/286
8,050,289 B1 * 11/2011 Masterson ......... H04N 21/2343
 370/465
(Continued)

FOREIGN PATENT DOCUMENTS

CN 102833053 A 12/2012
CN 103918299 A 7/2014
(Continued)

OTHER PUBLICATIONS

Sundararajan, J., et al., "Interfacing Network Coding with TCP: An Implementation," Tech. Rep., Aug. 2009, 9 pages.
(Continued)

*Primary Examiner* — Ronald B Abelson
(74) *Attorney, Agent, or Firm* — Slater Matsil, LLP

(57) ABSTRACT

Dynamic point selection (DPS) can be implemented using access points having partial or no DPS synchronization. Specifically, a mobile device may broadcast a bounce back message to access points participating in DPS transmissions to signal that a data segment has been successfully received and/or decoded by the mobile device. The bounce back message may cause the access points to drop remaining packets corresponding to the data segment from their buffers without sending those remaining packets over their respective radio interfaces. The bounce back message may be broadcast over any wireless signaling channel, such as via radio link control (RLC) signaling. Moreover, different priorities may be assigned to encoded packets intended for DPS transmission based on whether the encoded packets are communicated over a primary or secondary backhaul path.

37 Claims, 6 Drawing Sheets

(51) Int. Cl.
*H04L 1/12* (2006.01)
*H04W 72/12* (2009.01)

(56) References Cited

U.S. PATENT DOCUMENTS

| | | | | |
|---|---|---|---|---|
| 2001/0040883 | A1* | 11/2001 | Chang | H04B 7/2656 370/344 |
| 2002/0057706 | A1* | 5/2002 | Michiel | H04L 12/28 |
| 2002/0085582 | A1* | 7/2002 | Kim | H04L 47/245 370/445 |
| 2003/0087674 | A1* | 5/2003 | Li | H04B 7/0617 455/562.1 |
| 2003/0126468 | A1* | 7/2003 | Markham | H04L 63/0218 726/13 |
| 2004/0078438 | A1* | 4/2004 | Pyle | H04L 51/14 709/206 |
| 2004/0141523 | A1* | 7/2004 | Bhushan | H04L 1/0025 370/469 |
| 2008/0075002 | A1* | 3/2008 | Fourcand | H04L 47/10 370/230 |
| 2008/0144552 | A1* | 6/2008 | Johansson | H04L 1/0026 370/310 |
| 2008/0256270 | A1* | 10/2008 | Hubbs | H04L 45/12 710/38 |
| 2009/0303913 | A1* | 12/2009 | Yu | H04B 7/0669 370/312 |
| 2010/0067490 | A1* | 3/2010 | Chiu | H04L 12/1877 370/331 |
| 2010/0208697 | A1* | 8/2010 | Hori | H04W 28/18 370/331 |
| 2011/0085494 | A1* | 4/2011 | Ji | H04W 40/12 370/328 |
| 2012/0027008 | A1* | 2/2012 | Chou | H04L 45/00 370/352 |
| 2012/0188953 | A1 | 7/2012 | Won et al. | |
| 2012/0250737 | A1* | 10/2012 | Thoukydides | H04L 29/06 |
| 2012/0275342 | A1* | 11/2012 | Liu | H04L 45/121 370/255 |
| 2013/0310098 | A1* | 11/2013 | Baligh | H04L 5/0032 455/509 |
| 2014/0098770 | A1 | 4/2014 | Zhou et al. | |
| 2014/0226547 | A1* | 8/2014 | Zainaldin | H04B 7/15521 370/311 |
| 2014/0233378 | A1 | 8/2014 | Jappila et al. | |
| 2014/0376461 | A1* | 12/2014 | Park | H04W 16/14 370/329 |
| 2015/0208274 | A1* | 7/2015 | Himayat | H04N 21/2365 370/230 |
| 2015/0312152 | A1* | 10/2015 | Kerr | G06Q 10/04 370/254 |

FOREIGN PATENT DOCUMENTS

CN 104333908 A 2/2015
WO WO2011149314 * 12/2011 ............ H04W 36/14

OTHER PUBLICATIONS

Barros, J., et al., "Effective Delay Control in Online Network Coding," IEEE INFOCOM, Apr. 19-25, 2009, pp. 208-216.

* cited by examiner

_US 10,230,650 B2_

JOINT RADIO LINK CONTROL (RLC) SIGNALING WITH NETWORK CODING

TECHNICAL FIELD

The present invention relates generally to managing the allocation of resources in a network, and in particular embodiments, to techniques and mechanisms for joint radio link control (RLC) signaling with network coding.

BACKGROUND

In wireless communications, the wireless link between a wireless access point and a mobile device is often the bottleneck. For example, the data rate over backhaul network connections between a network node (e.g., packet gateway) and the access point may be many times faster than the data rate over the wireless link. Some networks may attempt to compensate for this by transmitting information to a given user equipment from multiple access points using downlink coordinated multipoint (DL-CoMP) transmission techniques. Dynamic point selection (DPS) is one type of DL-CoMP technique that communicates a single traffic flow to multiple access points capable of performing transmissions to a mobile device. The traffic flow is then communicated from whichever access point has the highest quality radio connection, thereby improving the data rate experienced by the mobile device.

DPS transmissions are often implemented between access points interconnected by high data rate backhaul connections. In such cases, the high speed backhaul connections are used by the access points to coordinate which data segments have been communicated to the user equipment. However, in some situations, it may be desirable to implement DPS transmission between access points that are not interconnected with a high speed backhaul connection capable of providing full DPS synchronization. For example, the access points may not have a backhaul inter-connection, or may have a backhaul inter-connection that is not fast enough to fully coordinate the DPS transmissions. In other situations, it may be desirable to save backhaul resources by implementing DPS transmissions without full DPS synchronization. Implementing DPS transmission in conventional systems may be inefficient when the participating access points do not coordinate which data segments have been successfully communicated to the mobile device, as the access points may redundantly communicate the same data to the mobile device. Accordingly, techniques for coordinating efficient DPS transmissions between access points lacking high data rate backhaul connections are desired.

SUMMARY OF THE INVENTION

Technical advantages are generally achieved by embodiments of this disclosure which describe joint radio link control (RLC) signaling with network coding.

In accordance with an embodiment, a method for performing joint transmissions is provided. In this example, the method includes transmitting at least some packets in a first set of packets over a first wireless interface during a first time period. The first wireless interface extends from a first access point to a mobile device. The first set of packets correspond to a first data segment of a traffic flow that is assigned to be jointly communicated to the mobile device by the first access point and a second access point in accordance with a dynamic point selection (DPS) transmission scheme. The method further includes receiving a bounce back message broadcast from the mobile device to the first access point and the second access point. The bounce back message indicates that the first data segment has been successfully decoded by the mobile device. The mobile device further includes dropping remaining packets in the first set of packets in response to the broadcast bounce back message. An apparatus for performing this method is also provided.

In accordance with another embodiment, a method for coordinating joint transmissions is provided. In this example, the method includes receiving packets corresponding to a first data segment during a first time period. The packets are received from at least one of two or more access points assigned to communicate the first data segment to the mobile device in accordance with a dynamic point selection (DPS) transmission scheme. The method further includes decoding the first data segment using the packets received during the first time period, and broadcasting a bounce back message to the two or more access points at the end of the first time period. The bounce back message indicates that the first data segment has been successfully decoded. An apparatus for performing this method is also provided.

In accordance with yet another embodiment, a method for prioritizing packets during joint transmission is provided. In this example, the method includes generating a secondary encoded packet from content in an encoded packet corresponding to a traffic flow assigned to be communicated to a user equipment (UE) by a first access point and a second access point in accordance with a dynamic point selection (DPS) scheme. The method further includes generating a secondary encoded packet from content in the encoded packet, transmitting the encoded packet over a primary path extending from the network node to the first access point, and transmitting the secondary encoded packet over a secondary path extending from the network node to the second access point. Transmitting the secondary encoded packet over the secondary path instructs the second access point to process the secondary encoded packet with a lower priority than other packets received over primary paths. An apparatus for performing this method is also provided.

In accordance with yet another embodiment, another method for prioritizing packets during joint transmission is provided. In this example, the method comprises generating a secondary encoded packet from content in an encoded packet corresponding to a traffic flow assigned to be communicated to a user equipment (UE) by a first access point and a second access point in accordance with a dynamic point selection (DPS) scheme. The secondary encoded packet has an encoding state that is different than that of the encoded packet. The method further includes transmitting the encoded packet to the first access point and the secondary encoded packet to the second access point. The encoding state of the secondary encoded packet instructs the second access point to process the encoded packet with a lower priority than other packets having different encoding states. An apparatus for performing this method is also provided.

In accordance with yet another embodiment, a method for performing dynamic point selection (DPS) transmissions is provided. In this example, the method includes receiving encoded packets corresponding to a traffic flow assigned to be jointly communicated to a mobile device by the first access point and a second access point in accordance with a DPS transmission scheme. The method further includes receiving DPS control signaling from the second access point over a backhaul link. The DPS control signaling indicates at least one of a transmission rate of the second access point, a predicted scheduled packet transmission of the second access point, and an encoding status of the mobile device. The method further comprises assigning priorities to the encoded packets in accordance with the DPS control signaling, and transmitting at least some of the encoded packets to mobile device in accordance with the assigned priorities. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
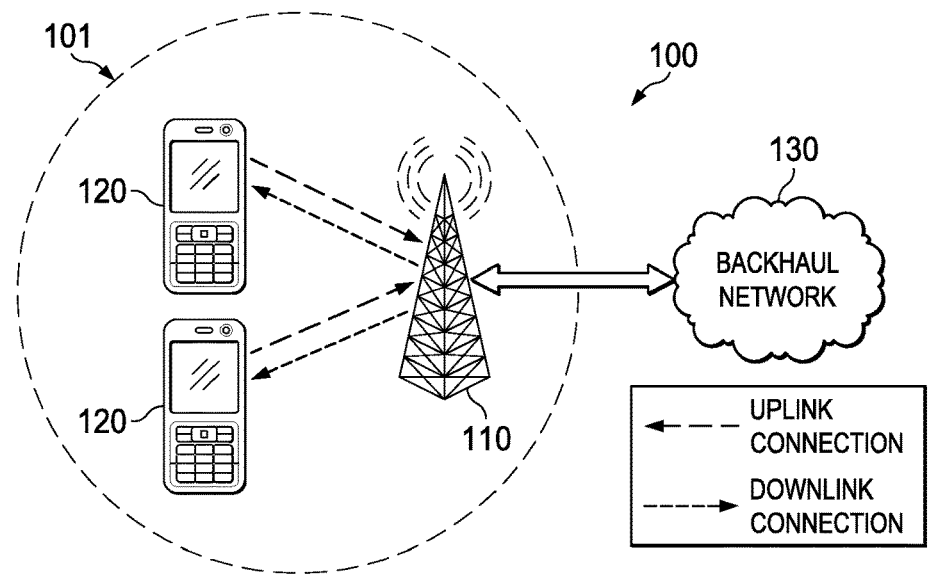
FIG. 1 illustrates a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Aspects of this disclosure provide techniques for coordinating dynamic point selection (DPS) between access points having partial or no DPS synchronization. Specifically, a mobile device may broadcast a bounce back message to access points participating in DPS transmissions to signal that a data segment has been successfully received and/or decoded by the mobile device. The bounce back message may prompt the access points to drop remaining packets corresponding to the data segment from their buffers without sending those remaining packets over their respective radio interfaces. This may reduce the amount of redundant data that is transmitted over the radio resources, and improve the overall spectral efficiency of the network, as well as improve the quality of service (QoS) experienced by the mobile device. The bounce back message may be broadcast over any wireless signaling channel, such as via radio link control (RLC) signaling.

Aspects of this disclosure provide techniques for assigning priorities to encoded packets intended for DPS transmission. In some embodiments, encoded packets are assigned priorities at a network node located upstream from access points participating in DPS transmission. In one example, an encoded packet received (or otherwise obtained) by the network node is assigned a primary path and a secondary path. The primary and secondary paths extend from the network node to different access points assigned to transmit data to a mobile device in accordance with a DPS transmission scheme. The network node then generates a secondary encoded packet from the encoded packet, and sends the encoded packet over the primary path, and the secondary encoded packet over the secondary path. In some embodiments, the network node generates the secondary encoded packet by replicating the encoded packet. In other embodiments, the network node generates the secondary encoded packet by encoding content in the encoded packet using different encoding parameters than were used to generate the encoded packet. For example, the secondary encoded packet may have a higher or lower coding rate than the encoded packet. If the underlying encoding is systematic, the primary path's encoded packet may correspond to the systematic encoding which essentially does not change the contents of the packet (ignoring the addition of a header). Transmitting the encoded packet and the secondary packet over the primary and secondary paths, respectively, may instruct corresponding downstream network nodes to process the packets with different priorities. For example, an access point receiving the secondary encoded packet over the secondary path may process the encoded packet with a lower priority than other packets received over primary paths. Alternatively, encoding states (e.g., systematic, nonsystematic) of the encoded packet and the secondary encoded packet may instruct the corresponding downstream networks to process the packets with different priorities. In one embodiment, the access point receiving the secondary encoded packet stores the secondary encoded packet in a buffer for a delay time period prior to transmitting the secondary encoded packet to the mobile device in accordance with the DPS scheme. The access point drops the secondary encoded packet from the buffer if a bounce back message corresponding to the secondary encoded packet is received prior to transmitting the secondary encoded packet to the UE. The access point receiving the encoded packet may buffer the packet for a shorter time period, e.g., process the packet without buffering the packet for a delay time period.

In other embodiments, encoded packets are assigned priorities upon being received by the access points participating in DPS transmission. In one example, the access points assign a priority to an encoded packet based on a likelihood that information carried by the encoded packet will be redundant upon being received by the UE, which may be determined in accordance with a latency associated with a path over which the encoded packet was received, a latency associated with a wireless interface over which the encoded packet is to be transmitted to the UE, an expected buffering time period of the encoded packet, or combinations thereof. In some embodiments, the access points assign priorities to the encoded packets based on information carried in DPS control signaling received from other access points participating in the DPS transmission. The DPS control signaling may specify a transmission rate of the other access point(s), a previous or scheduled packet transmission of the other access point(s), or an actual/estimated decoding state of the UE. These priorities can be used in several ways. For example, the priorities may determine the order in which the packets are transmitted, such that packets with higher priorities are transmitted over a particular port, or to a particular user, in preference to packets having lower priorities. The priorities may also be used to assign a weighting factor (e.g., a likelihood) used to transmit packets over a particular port, or to a user, in accordance with a fairness-type scheduling scheme, e.g., proportionally fair or otherwise. These and other aspects are discussed in greater detail below.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an evolved NodeB (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, and low power nodes.

Figure 2:
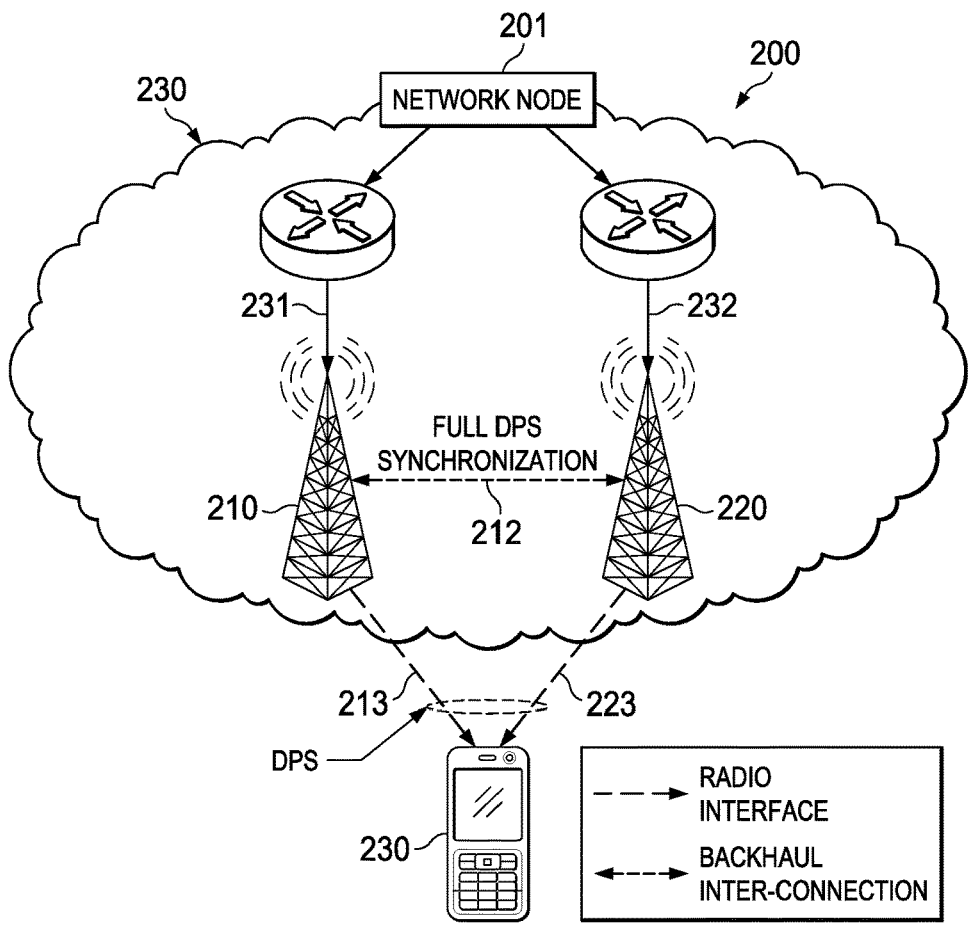
FIG. 2 illustrates a diagram of a conventional network architecture for supporting DPS transmissions.

FIG. 2 illustrates a conventional network architecture 200 for supporting DPS transmissions. As shown, the conventional network architecture 200 comprises a backhaul network 230 that includes a common network node 201 and a plurality of access points 210, 220. The common network node 201 may be any data plane entity in a network 230. For example, the common network node 201 may be a packet gateway (PGW) or serving gateway (SGW) in an evolved packet core (EPC) domain of the network 230. The common network node 201 may be configured to receive a traffic flow destined for the user equipment 250, and to communicate the traffic flow to the access points 210, 220 adapted to provide DPS transmission. The common network node 201 may communicate the traffic flow to both the access points 210, 220 by multicasting the traffic flow over the links 231, 232. Alternatively, the common network node 201 may communicate the traffic flow to the access point 210 by sending the traffic flow over the links 231, and the access point 210 may distribute the traffic flow to the access point 220 via the backhaul interface 212.

The access points 210, 220 are adapted to perform DPS transmissions to the user equipment (UE) 250 over the links 213, 223. Notably, the access points 210, 220 communicate control signaling over the backhaul interface 212 in order to coordinate which data segments are communicated over the links 213, 223. As one example, the access points 210, 220 may exchange control messaging that indicates which data segments have been successfully transmitted over the respective links 213, 223. As another example, the access points 210, 220 may exchange control messaging that indicates which data segments are scheduled to be transmitted over the respective links 213, 223.

In some network scenarios, full DPS synchronization may be unavailable. For example, there may be no backhaul interface between access points participating in DPS transmission. As another example, the backhaul interface between the access points may be too slow to adequately coordinate DPS transmissions. As yet another example, the network operator may be unwilling to allocate sufficient backhaul resources for carrying signaling related to DPS synchronization. Without full DPS synchronization, access points using conventional techniques may communicate large amounts of redundant data over the radio resources, thereby resulting in relatively inefficient DPS transmissions, e.g., low spectral efficiencies, and reduced power utilization efficiency.

Figure 3:
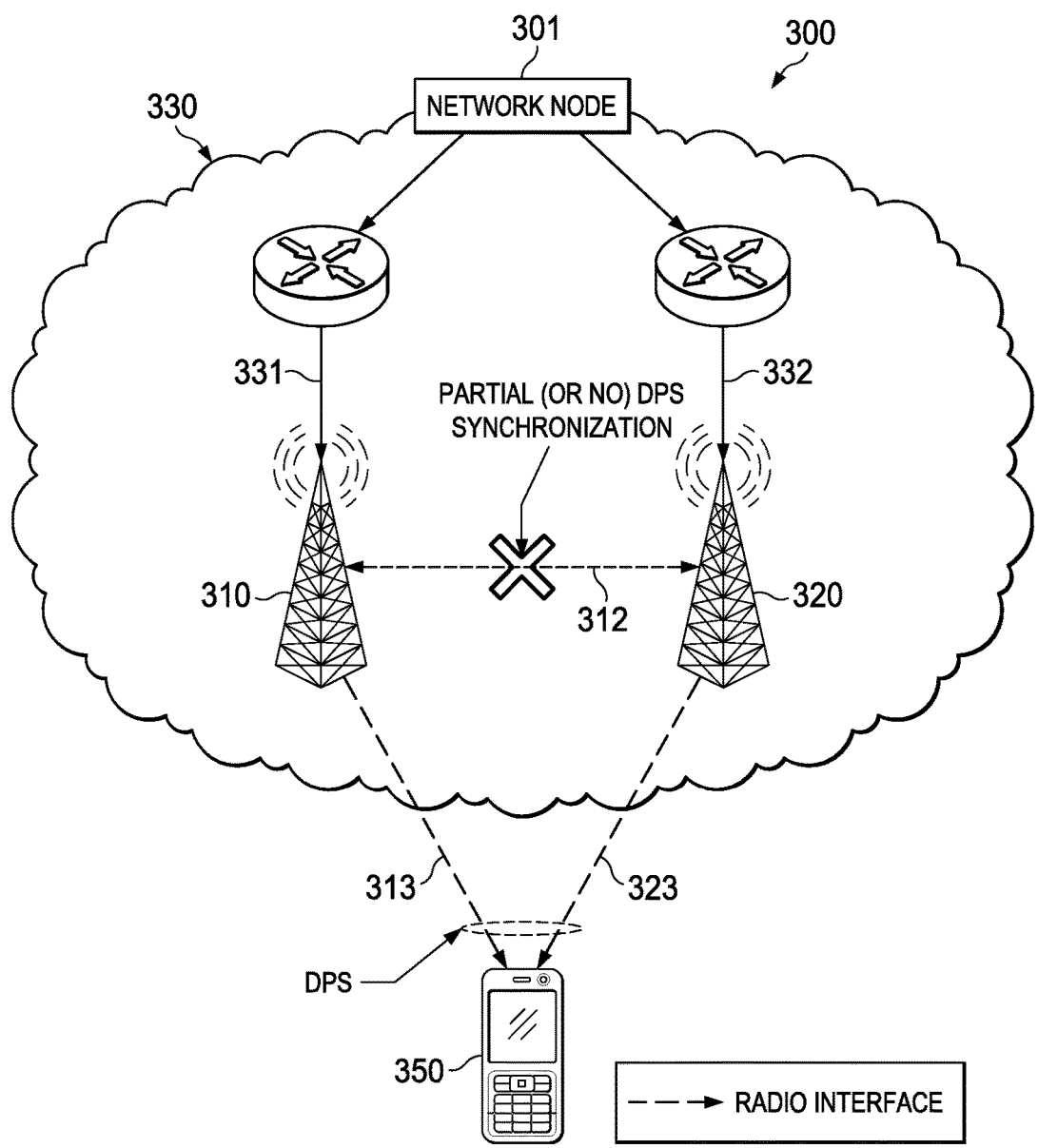
FIG. 3 illustrates a diagram of an embodiment network architecture for supporting DPS transmissions.

Aspects of this disclosure provide techniques for coordinating DPS transmissions between access points that do not have access to high speed backhaul interconnections. FIG. 3 illustrates an embodiment network architecture 300 for achieving efficient DPS transmission with partial or no DPS synchronization. As shown, the embodiment network architecture 300 comprises a backhaul network 330 that includes a common network node 301 and a plurality of access points 310, 320. The common network node 301 receives a traffic flow destined for the mobile device 350, and communicates the traffic flow to the access points 310, 320 for DPS transmission.

The access points 310, 320 are adapted to perform DPS transmissions to the mobile device 350 over the links 313, 323. However, unlike the access points 210, 220 in the conventional network architecture 200, the access points 310, 320 are not able to achieve full DPS synchronization over the backhaul interface 312. Instead, the backhaul interface 312 may be either capable of supporting only partial DPS synchronization, or may otherwise be nonexistent, e.g., there may be no direct backhaul interconnection between the access points 310, 320. Rather than relying on DPS synchronization over the backhaul interface 312, the access points 310, 320 may rely on signaling from the mobile device 350 to coordinate their DPS transmissions. More specifically, the mobile device 350 may communicate a bounce back message to the access points 310, 320 when a data segment has been successfully received and/or decoded. The bounce back message may prompt the access points to drop remaining packets corresponding to the data segment without transmitting those remaining packets over the links 313, 323.

Figure 4:
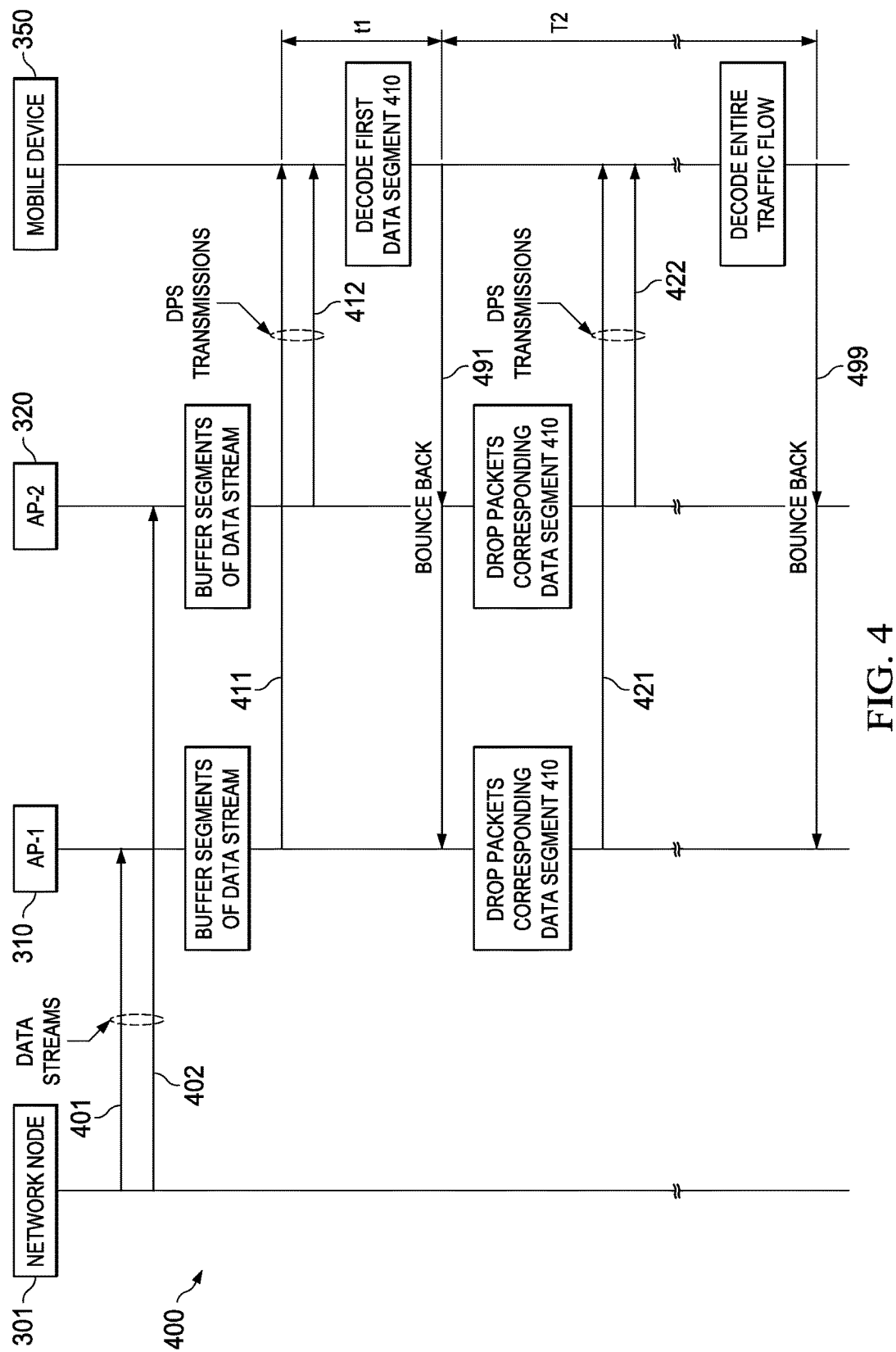
FIG. 4 illustrates a protocol diagram of an embodiment communications sequence for coordinating DPS transmission between access points.

FIG. 4 illustrates a communications sequence 400 for coordinating DPS transmission between the access points 310, 320. As shown, the communications sequence 400 begins when the network node 301 communicates data streams 401, 402 to the access points 310, 320, respectively, where they are buffered. The data streams 401, 402 include packets corresponding to at least a first data segment 410 of a common traffic flow.

After buffering the data streams 401, 402, the access points 310, 320 communicate DPS transmissions 411, 412 to the mobile device 350 during a first time period (t1). The DPS transmissions 411, 412 carry at least some of the packets corresponding to the first data segment 410, and allow the mobile device 350 to successfully decode the first data segment 410. After successfully decoding the first data segment 410, the mobile device 350 broadcasts a bounce back message 491 to the access points 310, 320. The bounce back message 491 indicates that the first data segment 410 has been successfully decoded, and prompts the access points 310, 320 to drop any remaining packets corresponding to the first data segment 410 without sending those remaining packets to the mobile device 350. Portions of this disclosure describe a mobile device that decodes a data segment using packets received during a first time period, and then broadcasts a bounce back message to multiple access points indicating that the data segment has been successfully decoded. It should be appreciated that those descriptions use the term "first time period" loosely to refer to a period of time preceding communication of the bounce back message, and that the term "first time period" should not be construed as a predetermined time interval. Other portions of this disclosure discuss "buffering time periods" and "delay time periods," which may be predetermined time intervals (e.g., a packet is buffered for 10 ms) or variable time intervals (e.g., a packet is buffered until a control instruction is received). After dropping the packets corresponding to the first data segment 410, the access points 310, 320 perform DPS transmissions 421, 422 to communicate other portions of the traffic flow (e.g., the rest of the traffic flow) to the mobile device 350. In some embodiments, other segments (e.g., segments preceding and/or following the first data segment 410 in the traffic flow) may be communicated concurrently with, or prior to, communication of the first data segment. The rest of the traffic flow may be communicated on a segment-by-segment basis until the mobile device 350 decodes the entire traffic flow. After decoding the traffic flow in its entirety, the mobile device 350 broadcasts a final bounce back message 499 to the access points 310, 320 indicating that the traffic flow has been successfully decoded. The final bounce back message 499 prompts the access points 310, 320 to drop any remaining packets corresponding to the traffic flow, and cease performing DPS transmissions for that traffic flow.

Notably, the data streams 401, 402 may have different levels of redundancy with respect to a given data segment and/or traffic flow. The data streams 401, 402 may be completely redundant with respect to the first data segment such that the data stream 401 includes the same set of packets as the data stream 402. For example, the data streams 401, 402 may include an identical stream of packets multicast from the common node 301 to the access points 310, 320.

Alternatively, the data streams 401, 402 are partially redundant (or non-redundant) streams of packets that are unicast from the common node 301 to the access points 310, 320, respectively. In that scenario, the data stream 401 includes at least some packets excluded from the data stream 402, or vice versa. For example, the data streams 401, 402 may include partially overlapping streams of packets that share fewer than all packets corresponding to the first data segment. As another example, the data streams 401, 402 may include different subsets of forward error correction (FEC) packets generated from the first data segment. As discussed herein, FEC packets are obtained by encoding data in a manner that introduces redundancy into the data stream. For example, a traffic flow may be encoded to obtain a string of FEC bits that includes information bits and parity bits. The information bits may correspond to raw or encoded data of the traffic flow, and may be used during decoding to reproduce the traffic flow. The parity bits may comprise error correction information for the information bits, and may be used during decoding to correct errors in the reproduced traffic flow, or to compensate for undelivered packets. Stated differently, parity bits may allow the traffic flow to be successfully decoded even when some of the information bits are incorrect (e.g., erroneously decoded) or otherwise not available. In an embodiment, the data streams 401, 402 include different subsets of fountain encoded packets.

Figure 5:
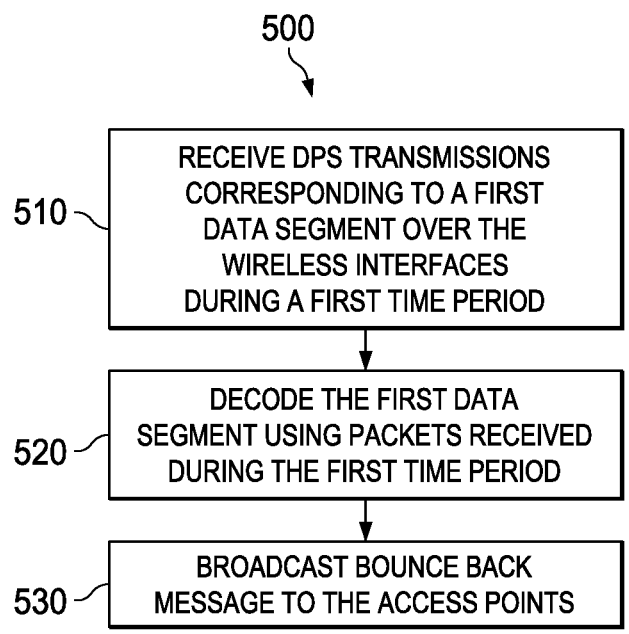
FIG. 5 illustrates a flow chart of an embodiment method for coordinating DPS transmission between access points.

Aspects of this disclosure provide embodiment methods for coordinating DPS transmissions between access points lacking high speed backhaul interfaces. FIG. 5 illustrates a flowchart of an embodiment method 500 for coordinating for coordinating DPS transmissions between disjoint access points, as might be performed by a mobile device. Disjoint access points may be unable to fully coordinate, or otherwise synchronize, DPS transmissions to a mobile device (e.g., due to the lack of a high-speed backhaul connection), and consequently may have incomplete knowledge as to which packets have been transmitted by one another. At step 510, the mobile device receives DPS transmissions over the wireless interfaces during a first time period. The DPS transmissions carry packets corresponding to a first data segment of a traffic flow. In some embodiments, all of the packets relating to the first data segment are received from a single access point, as may occur when the other access points are muted during the first time period. In other embodiments, different subsets of packets relating to the first data segment are received from different access points. At step 520, the mobile device decodes the first data segment using packets received during the first time period. At step 530, the mobile device broadcasts a bounce back message to the access points. The bounce back message may be communicated using various types of signaling, such as radio link control (RLC) signaling, and may prompt the access points to drop any remaining packets corresponding to the first data segment.

Figure 6:
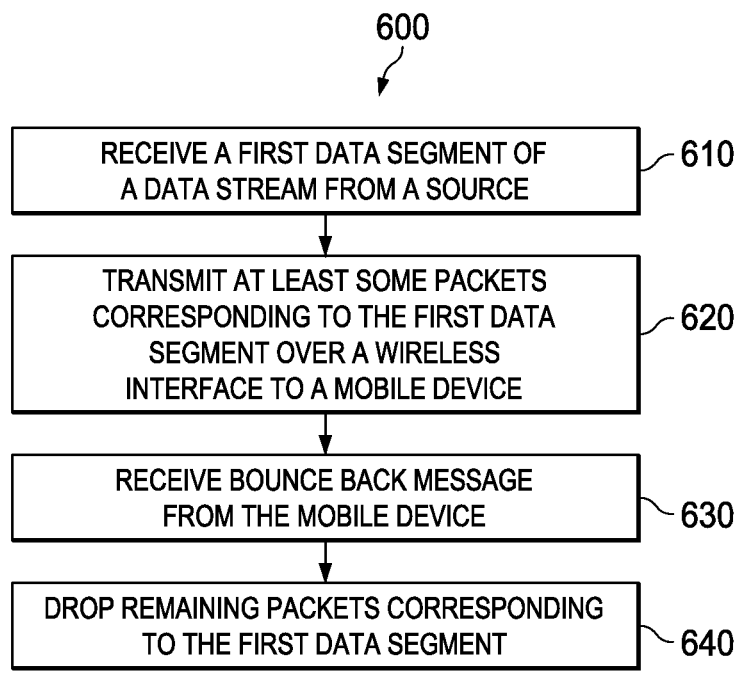
FIG. 6 illustrates a flow chart of another embodiment method for coordinating DPS transmission between access points.

FIG. 6 illustrates a flowchart of an embodiment method 600 for performing DPS transmissions by disjoint access points lacking high speed backhaul interfaces, as may be performed by an access point adapted for DPS transmission. At step 610, the access point receives a first data segment of a data stream from a source. In one embodiment, the data segment includes packets. In another embodiment, the access point encodes the data segment to obtain packets corresponding to the data segment. At step 620, the access point transmits at least some of the packets corresponding to the first data segment over the wireless interface. At step 630, the access point receives a bounce back message from the mobile device. At step 640, the access point drops remaining packets corresponding to the first data segment.

Notably, bounce back messages may not be instantaneous, and may be communicated periodically by the receiver. Accordingly, there may be a delay between successful decoding of the data segment and reception of the bounce back message at the transmitters. In view of this, aspects of this disclosure provide techniques for reducing the amount of duplicate data transmitted by multiple nodes to the same receiver during the delay time period. One such technique is to utilize schedulers to reorder and/or prioritize packets prior to transmission. For example, a scheduler may prioritize packets based upon the likelihood that a particular packet will contain redundant information upon the packet being received by a receiver. As used herein, the term "redundant information" refers to information that would not be useful for decoding a data segment upon being received by a receiver, while the term "non-redundant information" refers to information that would be useful for decoding a data segment. For example, "non-redundant information" may include information bits, parity bits, control signaling, or any other type of information that a receiver would use to decode an encoded data segment. Generally speaking, information may become redundant upon the receiver successfully decoding the data segment.

Aspects of this disclosure provide embodiment techniques for prioritizing packets. In some embodiments, a scheduler associates each packet with a corresponding primary path and one or more secondary paths extending from a network node to access points participating in DPS transmission. The packet is then communicated from the network node to the access points over the respective paths. Access points receiving the packet over the primary path may process the packet normally, e.g., first-in-first-out. For instance, the packet may be buffered in accordance with a normal buffering time period prior to being transmitted to the mobile device. Conversely, access points receiving the packet over a secondary path may buffer the packet for an additional delay time period prior to transmitting the packet to the mobile device. If the access point determines that the packet contains redundant information during the buffering time period (e.g., a bounce back message is received), then the packet is dropped from the buffer. In some embodiments, a packet is associated with a 'don't use before time x' condition. The value of x (or the delay time period) can be chosen based on the expected transmission time along the primary path, plus some buffer time period. The length of the delay may be strategically chosen based on the network policy, e.g., longer delays reduce redundant data transmissions, while shorter delays provide faster decoding on the receiver side.

In other embodiments, the priority of a packet is assigned by schedulers in the access points upon the packet being received by the access points. For example, the schedulers may assign priorities to packets based on a likelihood that information in the packet will be redundant upon being received by a receiver. Hence, packets that are less likely to carry redundant information are transmitted prior to packets having higher likelihoods of carrying redundant information. This may reduce the probability that redundant information is transmitted over wireless resource during the delay time period between which the information becomes redundant and the access point receiving a broadcast bounce back message indicating that the information has become redundant. In an embodiment, a scheduler assigns priorities to encoded packets based on delays already experienced by the packet (e.g., delays over the backhaul network), as well as future delays that are projected to be experienced by the packet. Schedulers may utilize heuristics when prioritizing packets. These and other details are described in greater detail below.

Figure 7:
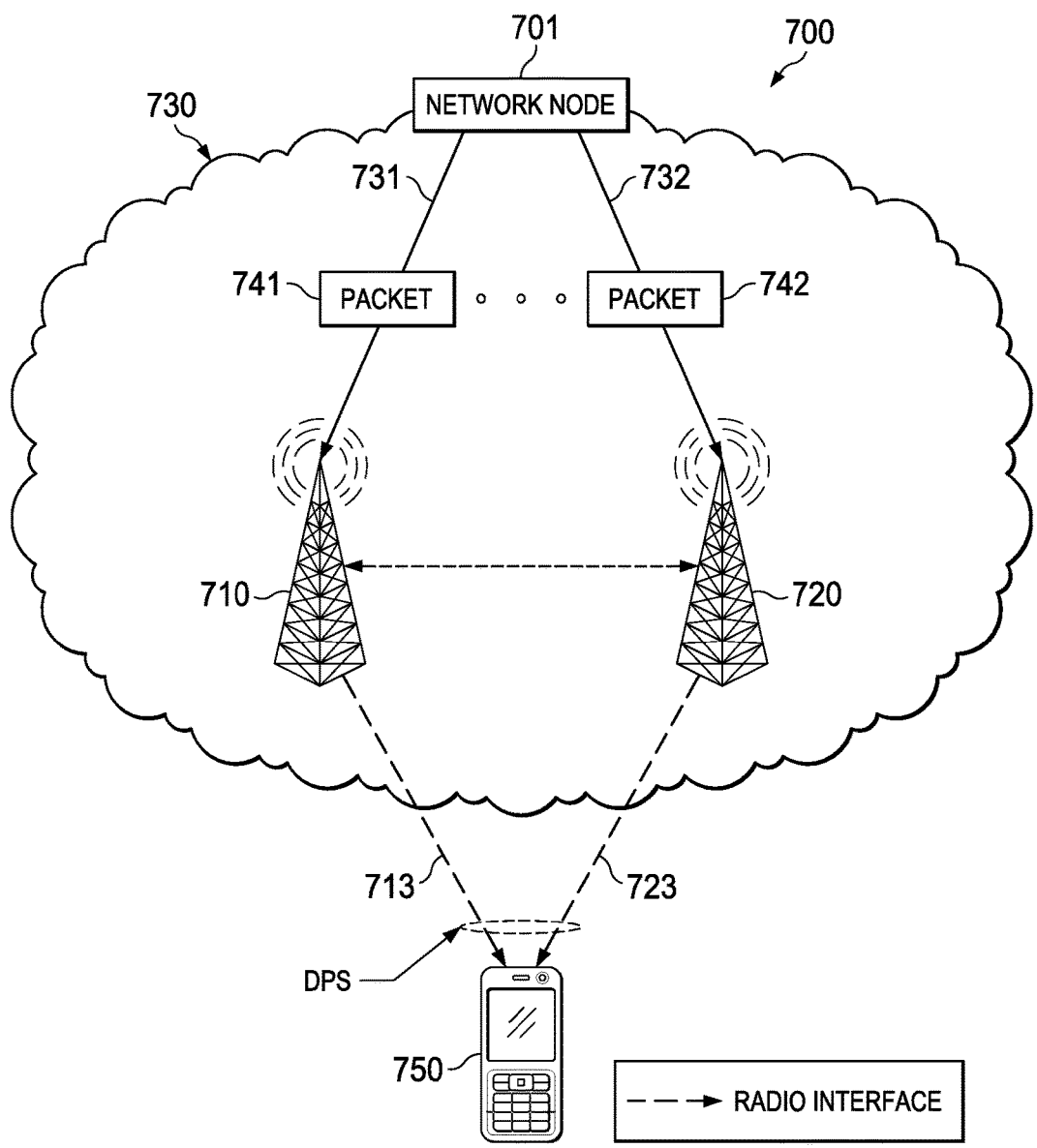
FIG. 7 illustrates a diagram of an embodiment network architecture for prioritizing packets during DPS transmissions.

FIG. 7 illustrates an embodiment network architecture 700 for prioritizing packets during DPS transmission. As shown, the embodiment network architecture 700 comprises a backhaul network 730 that includes a common network node 701 and a plurality of access points 710, 720. The common network node 701 receives or generates an encoded packet destined for the mobile device 750.

In an embodiment, a scheduler assigns primary and secondary paths to each packet. For example, a scheduler located in the network node 701, or in a different network component, may assign the path 731 as a primary path of the packet, and the path 732 as a secondary path of the packet. The network node 701 then communicates respective versions 741, 742 of the packet over the paths 731, 732. The packet 741 transported over the primary path 731 may be processed in accordance with a normal procedure by the access point 710. On the other hand, the packet 742 transported over the secondary path 732 may be processed with a lower priority than other packets received by the access point 720 over primary paths.

In one example, the access point 710 processes the packet 741 in accordance with a first-in-first-out (FIFO) processing scheme, while the access point 720 processes the packet 742 in accordance with a FIFO plus delay scheme. In such an example, the access point 710 may buffer the packet 741 for a normal buffering time period of the access point 710, while the access point 720 may buffer the packet 742 in accordance with an extended buffering time period, e.g., normal buffering time period of the access point 720 plus an extended delay time period. If either of the access points 710, 720 determines that the packets 741, 742 have become redundant during the buffering time period (e.g., receives a bounce back message from the mobile device 750), then the corresponding access point 710, 720 may drop the respective packet 741, 742 from its respective buffer.

In another embodiment, schedulers in the access points 710, 720 may perform scheduling upon receiving the packets 741, 742 at the access point. For example, schedulers in the access points 710, 720 may assign priorities to the packets after receiving them over the paths 731, 732, in which case the paths 731, 732 may not be assigned a primary or secondary designation. In an embodiment, the priority of the packets communicated over the paths 731, 732 is assigned as a function of the delay experienced by those packets. In such an embodiment, packets experiencing higher latencies will be assigned lower priorities than packets experiencing lower latencies, as packets experiencing greater delays may be more likely to be redundant upon being received by the mobile device. For example, the priority of a packet may be defined according to the following function:

$$\text{priority } f(d) = \begin{cases} c * d & d < \frac{1}{c} \\ 1 & \text{else} \end{cases},$$

where c is an arbitrary value chosen to reduce priority of that packet, and d is the delay experienced by the packet. These values may be proportional to the expected delay of the packet transmission in the other paths. A network device may assign a higher priority to a secondary packet if a delay time period expires without the network device receiving an indication that a data segment corresponding to the secondary packet has been decoded by a mobile device. In one example, the delay time period corresponds to a time period in which an encoded packet carrying the same information, or similar information, as the secondary packet is expected to have been received by the mobile device over another path (e.g., a primary path). The above-mentioned function is but one example, and other non-linear functions may also be implemented to determine delay time periods.

In another embodiment, the priority of the packets communicated over the paths 731, 732 is assigned by the schedulers in the access points 710, 720 based on a current decoder state and/or projected decoding rate of the mobile device 750. The decoder state may be approximated based on the last bounce back message observed plus some approximation of the transmission rate from the access points 710, 720. In one example, the decoder state is approximated by interpolating a history of bounce back messages communicated by the mobile device 750, e.g., each bounce back message can be used to estimate the amount of data received from all sources up to this point. In another example, the decoder state is approximated through direct communication between the access points 710, 720. The priority assigned to a packet can be a function of the distance (in bytes) from the estimated current state to when that packet would likely be classified as redundant information by the mobile device 750. For example if the mobile device 750 has successfully decoded a data stream up until a first bit location in the data stream (e.g., byte 10,000), then a packet received by the access point 720 containing info up to a third bit location (e.g., byte 22,000) could be calculated as being a certain number of bits away from becoming redundant (e.g., 22,000−10,000=12,000 bytes away from being redundant). The algorithm may also consider information shared between the access points 710, 720. For example, if the access point 710 notifies the access point that an additional data packet (e.g., carrying 1000 bytes) had been communicated (or scheduled), then the packet received by the access point 720 containing info up to the third bit location (e.g., byte 22,000) could be calculated as being a certain number of bits away from becoming redundant (e.g., 22,000−10,000=1,000=11,000 bytes away from being redundant). If knowledge of the rate, and fluctuations from other cells are also known, then the priority could be a function of the expected time until this packet is likely to become redundant. In an embodiment, the decoding state of a mobile device comprises a current decoding state that projects how much of a traffic flow has already been decoded by the mobile device. In another embodiment, the decoding state of a mobile device comprises a future decoding state projecting how much of the traffic flow will have been decoded by the mobile device at a future instance in time. In some embodiments, low priority packets may be dropped after priorities are assigned to reduce the amount of information buffered at the access points.

To increase the accuracy of packet prioritization, individual schedulers (e.g., located at access points 710, 720) may communicate DPS control signaling that specifies information pertaining to previous, current, or future DPS transmissions. For example, the DPS control signaling may indicate a transmission rate of an access point participating in the DPS transmission, a scheduled packet transmission of an access point participating in the DPS transmission, and/or an encoding status of a mobile device receiving the DPS transmission. In an embodiment, the DPS control signaling indicates that individual packets (or groups of packets) have been transmitted, or are scheduled to be transmitted at a future point in time. In an embodiment, the DPS control signaling indicates a transmission rate, a change in transmission rate, or an anticipated change in transmission rate. Notably, DPS control signaling may be particularly beneficial when historical information is non-representative of current or future transmission characteristics, e.g., due to a change in user position or channel quality, a handover, change in network circumstances such as heavy loading fluctuations.

Schedulers may assign different priorities to packets destined for a single user based on the packets' likelihood of including non-redundant information. Schedulers may also assign different priorities to packets destined for different users based on the packets' likelihood of including non-redundant information. Assigning different priorities to packets destined for different users may be referred to as inter-user prioritization. For example, a scheduler may assign fewer resources, or less frequent resources, to users when packets destined for those users are deemed to have a lower likelihood of including non-redundant information than packets for other users. In one example, this prioritization can be achieved using a weighted rate metric. For instance, the scheduler may calculate a weighted rate according to the following function: arg max$_i$ $r_i w_i w_{NC}$, where $r_i$ is a predicted transmit rate/block size over a particular scheduling resource(s) of a user (i), $w_i$ is a weight associated with the user (i) (e.g., Proportional Fair (PF), user class), $w_{NC}$ is the weight associated with the probability that this packet will be useful if successfully received by the device, and arg max is an argument of the maximum function that identifies a user (i) that provides a highest value for the argument/function ($r_i w_i w_{NC}$). In one example, the user providing the highest value for the argument/function is scheduled to the resource. In an embodiment, the $w_{NC}$ parameter may be calculated in accordance with the following function:

$$w_{NC} = \begin{cases} 1 & \text{uncoded} \\ \min\left(\frac{d}{d_{th}}, 1\right) & \text{coded} \end{cases},$$

where d is the average delay until information would become redundant based on historical data. The d parameter may be computed based on an expected rate, and a 'current' decoder state. The $d_{th}$ parameter is a delay threshold. In one example, the delay threshold is a scalar value corresponding to the expected transmission delay. In the above we have also adjusted prioritization based on if the data is information or parity.

Figure 8:
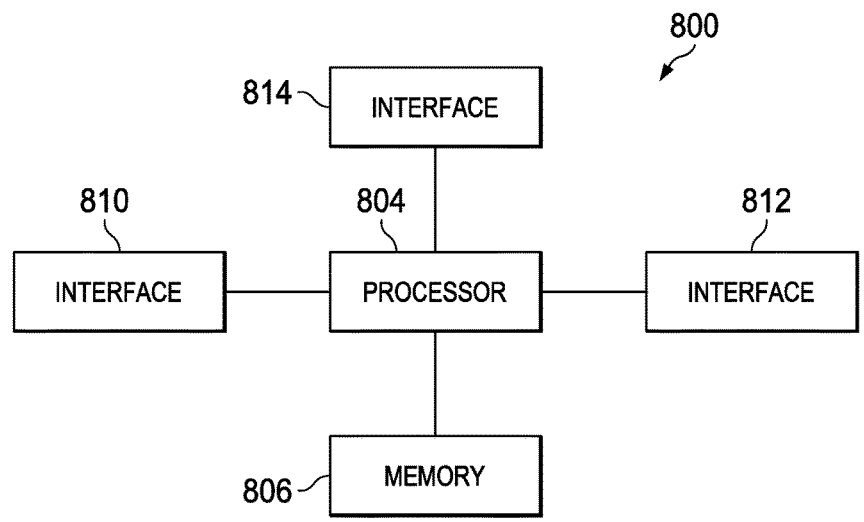
FIG. 8 illustrates a diagram of an embodiment processing system.

FIG. 8 illustrates a block diagram of an embodiment processing system 800 for performing methods described herein, which may be installed in a host device. As shown, the processing system 800 includes a processor 804, a memory 806, and interfaces 810-814, which may (or may not) be arranged as shown in FIG. 8. The processor 804 may be any component or collection of components adapted to perform computations and/or other processing related tasks, and the memory 806 may be any component or collection of components adapted to store programming and/or instructions for execution by the processor 804. In an embodiment, the memory 806 includes a non-transitory computer readable medium. The interfaces 810, 812, 814 may be any component or collection of components that allow the processing system 800 to communicate with other devices/components and/or a user. For example, one or more of the interfaces 810, 812, 814 may be adapted to communicate data, control, or management messages from the processor 804 to applications installed on the host device and/or a remote device. As another example, one or more of the interfaces 810, 812, 814 may be adapted to allow a user or user device (e.g., personal computer (PC), etc.) to interact/communicate with the processing system 800. The processing system 800 may include additional components not depicted in FIG. 8, such as long term storage (e.g., non-volatile memory, etc.).

In some embodiments, the processing system 800 is included in a network device that is accessing, or part otherwise of, a telecommunications network. In one example, the processing system 800 is in a network-side device in a wireless or wireline telecommunications network, such as a base station, a relay station, a scheduler, a controller, a gateway, a router, an applications server, or any other device in the telecommunications network. In other embodiments, the processing system 800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 9:
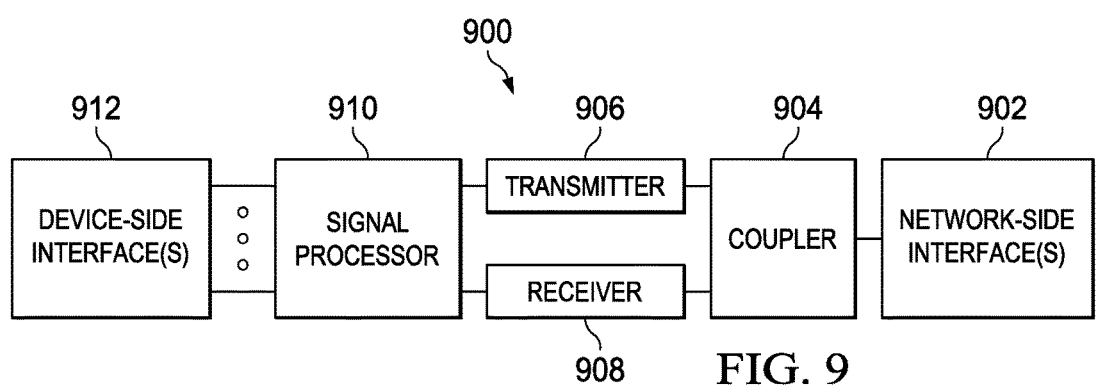
FIG. 9 illustrates a diagram of an embodiment transceiver.

In some embodiments, one or more of the interfaces 810, 812, 814 connects the processing system 800 to a transceiver adapted to transmit and receive signaling over the telecommunications network. FIG. 9 illustrates a block diagram of a transceiver 900 adapted to transmit and receive signaling over a telecommunications network. The transceiver 900 may be installed in a host device. As shown, the transceiver 900 comprises a network-side interface 902, a coupler 904, a transmitter 906, a receiver 908, a signal processor 910, and a device-side interface 912. The network-side interface 902 may include any component or collection of components adapted to transmit or receive signaling over a wireless or wireline telecommunications network. The coupler 904 may include any component or collection of components adapted to facilitate bi-directional communication over the network-side interface 902. The transmitter 906 may include any component or collection of components (e.g., up-converter, power amplifier, etc.) adapted to convert a baseband signal into a modulated carrier signal suitable for transmission over the network-side interface 902. The receiver 908 may include any component or collection of components (e.g., down-converter, low noise amplifier, etc.) adapted to convert a carrier signal received over the network-side interface 902 into a baseband signal. The signal processor 910 may include any component or collection of components adapted to convert a baseband signal into a data signal suitable for communication over the device-side interface(s) 912, or vice-versa. The device-side interface(s) 912 may include any component or collection of components adapted to communicate data-signals between the signal processor 910 and components within the host device (e.g., the processing system 800, local area network (LAN) ports, etc.).

The transceiver 900 may transmit and receive signaling over any type of communications medium. In some embodiments, the transceiver 900 transmits and receives wireless signaling. For example, the transceiver 900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 902 comprises one or more antenna/radiating elements. For example, the network-side interface 902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for performing joint transmissions, the method comprising:
   receiving, by a first access point, a first set of packets comprising an encoded packet over a path extending from an upstream node to the first access point;
   storing, at the first access point, the first set of packets in a buffer;
   identifying, by the first access point, a priority associated with the encoded packet, wherein the priority corresponds to a likelihood that information carried by the encoded packet will be redundant upon being received by a mobile device, and wherein the identifying comprises determining the priority associated with the encoded packet in accordance with one or a combination of a latency associated with the path or a latency associated with a first wireless interface;
   processing, by the first access point, the encoded packet in accordance with the priority, the processing comprising transmitting, by the first access point, at least some packets of the first set of packets from the buffer of the first access point over the first wireless interface to the mobile device during a first time period, the at least some packets including the encoded packet, the first set of packets corresponding to a first data segment of a traffic flow, the traffic flow assigned to be jointly communicated to the mobile device by the first access point and a second access point in accordance with a dynamic point selection (DPS) transmission scheme that requires a given portion of the traffic flow to be transmitted to the mobile device from whichever one of the first and second access points that is deemed to have a higher quality radio connection with the mobile device, wherein the first access point belongs to a first radio access network (RAN), and wherein the second access point belongs to a second RAN that is different from the first RAN;
   during the transmitting, receiving, by the first access point, a bounce back message broadcast from the mobile device to the first access point and the second access point, the bounce back message indicating that the first data segment, was received by the mobile device according to the DPS transmission scheme and was successfully decoded by the mobile device; and
   after the receiving the bounce back message, dropping, from the buffer of the first access point, packets of the first set of packets remaining in the buffer of the first access point.

2. The method of claim 1, wherein the bounce back message is communicated via radio link Radio Link Control (RLC) signaling.

3. The method of claim 1, further comprising:
   receiving, by the first access point, a second encoded packet over a primary path extending from the upstream node to the first access point;
   identifying, by the first access point, a priority associated with the second encoded packet in accordance with a priority assigned to the path by a scheduler, wherein the second encoded packet is transmitted over both the primary path and a secondary path by the upstream node; and processing, by the first access point, the second encoded packet in accordance with the identified priority associated with the second encoded packet.

4. The method of claim 1, wherein processing the encoded packet in accordance with the identified priority comprises:
   transmitting, by the first access point, the encoded packet after a normal buffering time period when the path is a primary path of the encoded packet;
   transmitting, by the first access point, the encoded packet after an extended buffering time period when the path is a secondary path of the encoded packet, wherein the extended buffering time period comprises the normal buffering time period plus an additional delay time period; and
   dropping, by the first access point, the encoded packet from the buffer without transmitting the encoded packet to the mobile device when a bounce back message corresponding to the encoded packet is received prior to transmission of the encoded packet to the mobile device.

5. A method for performing joint transmissions, the method comprising:
   receiving, by a first access point, a first set of packets over a path extending from an upstream node to the first access point;
   identifying, by the first access point, a priority associated with each packet in the first set of packets, wherein the priority corresponds to a likelihood that information carried by the packet will be redundant upon being received by a mobile device; and
   processing, by the first access point, each packet in accordance with the priority, the processing including:
   transmitting, by the first access point, at least some packets of the first set of packets from a buffer of the first access point over a first wireless interface to a mobile device during a first time period, the first set of packets corresponding to a first data segment of a traffic flow, the traffic flow assigned to be jointly communicated to the mobile device by the first access point and a second access point;
   during the transmitting, receiving, by the first access point, a bounce back message broadcast from the mobile device to the first access point and the second access point, the bounce back message indicating that the first data segment has been successfully decoded by the mobile device; and
   after receiving the broadcast bounce back message, dropping, from the buffer of the first access point, packets of the first set of packets remaining in the buffer of the first access point.

6. The method of claim 5, wherein identifying the priority associated with each packet comprises:
   determining, by the first access point, the priority associated with the each packet in accordance with one or a combination of a latency associated with the path, a latency associated with the first wireless interface, and an expected buffering time period between receiving the each packet and transmitting the each packet over the first wireless interface.

7. The method of claim 5, wherein identifying the priority associated with each packet comprises:
   estimating, by the first access point, a current decoding position and decoding rate of the mobile device, the current decoding position corresponding to a portion of the traffic flow having already been decoded by the mobile device;
   estimating, by the first access point, a future time period in which information carried by the each packet will become redundant; and
   assigning, by the first access point, the priority to the each packet such that a probability that the each packet will be communicated to the mobile device prior to the future time period exceeds a threshold.

8. A first access point comprising:
   a processor; and
   a computer readable storage medium storing programming for execution by the processor, the programming including instructions to:
   receive a first set of packets comprising an encoded packet over a path extending from an upstream node to the first access point;
   store the first set of packets in a buffer;
   identify a priority associated with the encoded packet, wherein the priority corresponds to a likelihood that information carried by the encoded packet will be redundant upon being received by a mobile device, and wherein the programming includes the instructions to identify the priority by determining the priority associated with the encoded packet in accordance with one or a combination of a latency associated with the path or a latency associated with a first wireless interface;
   process the encoded packet in accordance with the priority to:
   transmit at least some packets of the first set of packets from the buffer over a first wireless interface to the mobile device during a first time period, the at least some packets including the encoded packet, the first set of packets corresponding to a first data segment of a traffic flow that is assigned to be jointly communicated to the mobile device by the first access point and a second access point in accordance with a dynamic point selection (DPS) transmission scheme that requires a given portion of the traffic flow to be transmitted to the mobile device from whichever one of the first and second access points that is deemed to have a higher quality radio connection with the mobile device, wherein the first access point belongs to a first radio access network (RAN), and wherein the second access point belongs to a second RAN that is different from the first RAN;
   during transmission of the at least some packets of the first set of the packets, receive a bounce back message broadcast from the mobile device to the first access point and the second access point, the bounce back message indicating that the first data segment was received by the mobile device according to the DPS transmission scheme, has been and was successfully decoded by the mobile device; and
   after receiving the bounce back message, drop from the buffer packets of the first set of packets remaining in the buffer.

9. The first access point of claim 8, wherein the instructions to identify the priority associated with the encoded packet include instructions to:
   determine the priority associated with the encoded packet in accordance with one or a combination of a latency associated with the path, a latency associated with the first wireless interface, and an expected buffering time period between receiving the encoded packet and transmitting the encoded packet over the first wireless interface.

10. The first access point of claim 8, wherein the bounce back message is communicated via radio link Radio Link Control (RLC) signaling.

11. The first access point of claim 8, the programming further including instructions to:
  receive a second encoded packet over a primary path extending from the upstream node to the first access point;
  identify a priority associated with the second encoded packet in accordance with a priority assigned to the path by a scheduler, wherein the second encoded packet is transmitted over both the primary path and a secondary path by the upstream node; and
  process the second encoded packet in accordance with the identified priority associated with the second encoded packet.

12. The first access point of claim 8, wherein the instructions to process the encoded packet include instructions to:
  transmit the encoded packet after a normal buffering time period when the path is a primary path of the encoded packet;
  transmit the encoded packet after an extended buffering time period when the path is a secondary path of the encoded packet, wherein the extended buffering time period comprises the normal buffering time period plus an additional delay time period; and
  drop the encoded packet from the buffer without transmitting the encoded packet to the mobile device when a bounce back message corresponding to the encoded packet is received prior to transmission of the encoded packet to the mobile device.

13. A method for coordinating joint transmissions, the method comprising:
  receiving, by a mobile device, packets corresponding to a first data segment during a first time period, the packets being received from at least one of two or more access points assigned to communicate the first data segment to the mobile device in accordance with a dynamic point selection (DPS) transmission scheme that requires a given portion of a traffic flow to be transmitted to the mobile device from whichever one of the two or more access points that is deemed to have a higher quality radio connection with the mobile device, and each packet of a subset of the packets being received from a first access point of the two or more access points in accordance with a corresponding likelihood that information carried by the each packet will be redundant upon being received by the mobile device, wherein the corresponding likelihood corresponds to a priority associated with the each packet in accordance with one or a combination of a latency associated with a path extending from an upstream node to the first access point or a latency associated with a first wireless interface, and wherein at least a first one of the two or more access points belongs to a different radio access network (RAN) than a second one of the two or more access points;
  decoding, by the mobile device, the first data segment using the packets received during the first time period; and
  after the decoding, broadcasting, by the mobile device, a bounce back message to the two or more access points at an end of the first time period, the bounce back message indicating that the first data segment, was received by the mobile device according to the DPS transmission scheme, and was successfully decoded by the mobile device.

14. The method of claim 13, wherein the bounce back message is communicated via Radio Link Control (RLC) signaling.

15. The method of claim 13, wherein receiving packets corresponding to the first data segment during the first time period comprises:
  receiving, by the mobile device, a first set of packets corresponding to the first data segment over a first wireless interface without receiving a second set of packets corresponding to the first data segment over the first wireless interface, wherein the first wireless interface extends between the mobile device and a first one of the two or more access points, and
  wherein the bounce back message causes the first access point to drop the second set of packets corresponding to the first data segment without sending the second set of packets over the first wireless interface.

16. The method of claim 15, wherein the second set of packets includes at least some data that is excluded from the first set of packets.

17. The method of claim 16, wherein the second set of packets includes at least some information bits that are excluded from the first set of packets.

18. The method of claim 16, wherein the second set of packets includes at least some parity bits that are excluded from the first set of packets, the parity bits providing error correction for information bits carried in the first set of packets.

19. The method of claim 15, wherein decoding the first data segment using packets received during the first time period comprises:
  decoding, by the mobile device, the first data segment without receiving the second set of packets over any of wireless interfaces.

20. The method of claim 15, further comprising:
  receiving, by the mobile device, packets corresponding to a second data segment over the first wireless interface, wherein the second data segment is located after the first data segment in a traffic flow, and
  wherein the bounce back message causes the first access point to begin sending the packets corresponding to the second data segment over the first wireless interface without sending the second set of packets corresponding to the first data segment over the first wireless interface.

21. The method of claim 13, wherein the bounce back message causes the first access point and a second access point to drop remaining packets corresponding to the first data segment without communicating the remaining packets over wireless interfaces extending between the mobile device and the two or more access points.

22. A mobile device comprising:
  a processor; and
  a computer readable storage medium storing programming for execution by the processor, the programming including instructions to:
  receive packets corresponding to a first data segment during a first time period, the packets being received from at least one of two or more access points assigned to communicate the first data segment to the mobile device in accordance with a dynamic point selection (DPS) transmission scheme that requires a given portion of a traffic flow to be transmitted to the mobile device from whichever one of the two or more access points that is deemed to have a higher quality radio connection with the mobile device, and each packet of a subset of the packets being received from a first access point of the two or more access points in accordance with a corresponding likelihood that information carried by the each packet will be redundant upon being received by the mobile device, wherein the corresponding likelihood corresponds to a priority associated with the each packet in accordance with one or a combination of a latency associated with a path extending from an upstream node to the first access point or a latency associated with a first wireless interface, and wherein at least a first one of the two or more access points belongs to a different radio access network (RAN) than a second one of the two or more access points;

decode the first data segment using the packets received during the first time period; and after the first data segment is decoded, broadcast a bounce back message to the two or more access points at an end of the first time period, the bounce back message indicating that the first data segment, was received by the mobile device according to the DPS transmission scheme, and was successfully decoded by the mobile device.

23. A method for performing dynamic point selection (DPS) transmissions, the method comprising:

receiving, by a first access point, encoded packets corresponding to a traffic flow, wherein the traffic flow is assigned to be jointly communicated to a mobile device by the first access point and a second access point in accordance with a DPS transmission scheme;

receiving, by the first access point, DPS control signaling from the second access point over a backhaul link, wherein the DPS control signaling indicates at least one of a transmission rate of the second access point, a predicted scheduled packet transmission of the second access point, and an encoding status of the mobile device;

assigning, by the first access point, priorities to the encoded packets in accordance with the DPS control signaling; and transmitting, by the first access point, at least some of the encoded packets to mobile device in accordance with the assigned priorities.

24. The method of claim 23, wherein assigning priorities to the encoded packets in accordance with the DPS control signaling comprises:

estimating, by the first access point, a decoding state of the mobile device in accordance with the DPS control signaling; and assigning, by the first access point, priorities to the encoded packets in accordance with the estimated decoding state of the mobile device.

25. The method of claim 24, wherein the decoding state of the mobile device comprises a current decoding state projecting how much of the traffic flow has already been decoded by the mobile device.

26. The method of claim 25, wherein the decoding state of the mobile device comprises a future decoding state projecting how much of the traffic flow will have been decoded by the mobile device at a future instance in time.

27. The method of claim 24, wherein the encoded packets include a first encoded packet corresponding to a first data segment of the traffic flow and a second encoded packet corresponding to a second data segment of the traffic flow, the second data segment being positioned after the first data segment in the traffic flow, and wherein assigning priorities to the encoded packets in accordance with the estimated decoding state of the mobile device comprises assigning a higher priority to the second encoded packet than to the first encoded packet when the estimated decoding state of the mobile device indicates that the mobile device will have decoded up to at least the first data segment within a threshold period of time.

28. The method of claim 23, wherein the DPS control signaling specifies the transmission rate of the second access point.

29. The method of claim 23, wherein the DPS control signaling specifies the predicted scheduled packet transmission of the second access point.

30. The method of claim 23, wherein the DPS control signaling specifies the encoding status of the mobile device.

31. The method of claim 30, wherein the encoding status of the mobile device comprises a current decoding state of the mobile device as determined by a bounce back message communicated from the mobile device to the second access point, the bounce back message not having been directly communicated from the mobile device to the first access point.

32. The method of claim 30, wherein the encoding status of the mobile device comprises an estimated decoding state of the mobile device as determined by the second access point.

33. A non-transitory computer-readable storage medium having instructions stored thereon that, when executed by one or more processors of a computing device, cause the computing device to perform operations for performing joint transmissions, the operations comprising:

receiving a first set of packets comprising an encoded packet over a path extending from an upstream node to a first access point;

storing the first set of packets in a buffer;

identifying a priority associated with the encoded packet, wherein the priority corresponds to a likelihood that information carried by the encoded packet will be redundant upon being received by a mobile device, and wherein the identifying comprises determining the priority associated with the encoded packet in accordance with one or a combination of a latency associated with the path or a latency associated with a first wireless interface;

processing the encoded packet in accordance with the priority, the processing comprising transmitting, by the first access point, at least some packets of the first set of packets from the buffer of the first access point over a first wireless interface to the mobile device during a first time period, the at least some packets including the encoded packet, the first set of packets corresponding to a first data segment of a traffic flow, the traffic flow assigned to be jointly communicated to the mobile device by the first access point and a second access point in accordance with a dynamic point selection (DPS) transmission scheme that requires a given portion of the traffic flow to be transmitted to the mobile device from whichever one of the first and second access points that is deemed to have a higher quality radio connection with the mobile device, wherein the first access point belongs to a first radio access network (RAN), and wherein the second access point belongs to a second RAN that is different from the first RAN;

during the transmitting, receiving a bounce back message broadcast from the mobile device to the first access point and the second access point, the bounce back message indicating that the first data segment, was received by the mobile device according to the DPS transmission scheme and was successfully decoded by the mobile device; and after the receiving the bounce back message, dropping, from the buffer of the first access point, packets of the first set of packets remaining in the buffer of the first access point.

34. The non-transitory computer-readable storage medium of claim 33, wherein the bounce back message is communicated via radio link Radio Link Control (RLC) signaling.

35. The non-transitory computer-readable storage medium of claim 33, further comprising:

receiving a second encoded packet over a primary path extending from the upstream node to the first access point;

identifying a priority associated with the second encoded packet in accordance with a priority assigned to the path by a scheduler, wherein the second encoded packet is transmitted over both the primary path and a secondary path by the upstream node; and processing the second encoded packet in accordance with the identified priority associated with the second encoded packet.

36. The non-transitory computer-readable storage medium of claim 33, wherein processing the encoded packet in accordance with the identified priority comprises:

transmitting the encoded packet after a normal buffering time period when the path is a primary path of the encoded packet;

transmitting the encoded packet after an extended buffering time period when the path is a secondary path of the encoded packet, wherein the extended buffering time period comprises the normal buffering time period plus an additional delay time period; and dropping the encoded packet from the buffer without transmitting the encoded packet to the mobile device when a bounce back message corresponding to the encoded packet is received prior to transmission of the encoded packet to the mobile device.

37. A non-transitory computer-readable storage medium having instructions stored thereon that, when executed by one or more processors of a computing device, cause the computing device to perform operations for coordinating joint transmissions, the operations comprising:

receiving packets corresponding to a first data segment during a first time period, the packets being received from at least one of two or more access points assigned to communicate the first data segment to a mobile device in accordance with a dynamic point selection (DPS) transmission scheme that requires a given portion of a traffic flow to be transmitted to the mobile device from whichever one of the two or more access points that is deemed to have a higher quality radio connection with the mobile device, and each packet of a subset of the packets being received from a first access point of the two or more access points in accordance with a corresponding likelihood that information carried by the each packet will be redundant upon being received by the mobile device, wherein the corresponding likelihood corresponds to a priority associated with the each packet in accordance with one or a combination of a latency associated with a path extending from an upstream node to the first access point or a latency associated with a first wireless interface, and wherein at least a first one of the two or more access points belongs to a different radio access network (RAN) than a second one of the two or more access points;

decoding the first data segment using the packets received during the first time period; and after the decoding, broadcasting a bounce back message to the two or more access points at an end of the first time period, the bounce back message indicating that the first data segment, was received by the mobile device according to the DPS transmission scheme, and was successfully decoded by the mobile device.

\* \* \* \* \*